United States [11] 3,604,932

| [72] | Inventor | Allan David Beach<br>Newbury, England |
|---|---|---|
| [21] | Appl. No. | 15,117 |
| [22] | Filed | Feb. 27, 1970 |
| [45] | Patented | Sept. 14, 1971 |
| [73] | Assignee | National Research Development Corporation<br>London, England |
| [32] | Priority | Feb. 28, 1969, May 8, 1969 |
| [33] | | Great Britain |
| [31] | | 11007/69 and 23624/69 |

[54] INFRARED OPTICAL SCANNING SYSTEM COMPRISING A ROTATABLE FACETED MIRROR HAVING INCLINED FACETS
11 Claims, 5 Drawing Figs.

[52] U.S. Cl. ....................................... 250/83.3 H, 350/7
[51] Int. Cl. ........................................ G01j 1/04, G02b 17/00
[50] Field of Search ............................. 250/83.3 H, 83.3 HP; 350/7

[56] References Cited
UNITED STATES PATENTS

| 2,853,918 | 9/1958 | Yoler | 350/7 X |
| 3,153,723 | 10/1964 | Weiss | 250/83.3 H |
| 3,537,795 | 11/1970 | Clerc | 250/83.3 H |

*Primary Examiner*—Archie R. Borchelt
*Attorney*—Cushman, Darby & Cushman

ABSTRACT: An optical scanning system incorporates a rotatable faceted mirror with facets inclined to the rotation axis. The mirror is arranged substantially centrally with respect to a ring of imaging elements, e.g. concave mirrors, with one imaging element corresponding to each facet. The imaging elements are rotated synchronously with the faceted mirror so that each in turn is operative in conjunction with the corresponding facet to effect a line scan, the optical path extending from the faceted mirror parallel to the rotation axis towards a detector or a light source, preferably via a fixed optical relay system. The scanning system is particularly applicable to infrared thermography, and for this purpose may incorporate self-calibrating arrangements utilizing internal radiation sources.

INFRARED OPTICAL SCANNING SYSTEM COMPRISING A ROTATABLE FACETED MIRROR HAVING INCLINED FACETS

This invention relates to optical scanning systems suitable for infrared thermographic and radiometric scanning, although it may also have applications in systems using other forms of light including ultraviolet.

Thermographic scanning systems have one use in medicine, for determining the pattern of skin temperature over parts of a patient's body by the infrared radiation therefrom. This information can be used for example, to diagnose the presence of subcutaneous cancerous tissue which may modify the temperature distribution of the overlying skin.

Existing scanning systems and their associated signal-processing circuits provide a grey-scale output which indicates qualitatively the relative temperatures of skin areas. Such indications are liable to differences of interpretation as between observers. An output which was a quantitative measure of skin temperature would overcome this difficulty, but would require a higher quality of output (i.e. higher signal-to-noise ratio). This could only be obtained with existing scanning systems by substantially reducing the scanning rate, in order to reduce the bandwidth requirement of the subsequent signal-processing circuits.

In existing scanning systems, the sensitive area of infrared detector is imaged on to the subject to be scanned by an optical system which usually includes one or more plane mirrors which are moved to effect scanning action. Line scan is usually effected, for example, by a rotating drum carrying a multifaceted mirror on its outer surface. It can be shown that practical embodiments of such systems are inherently incapable of efficiently utilizing the time between the commencement of each scanning frame. For example, for a scan angle of 30° arc and an optical aperture of 10 cm. (both typical values), a minimum drum diameter of 3 meters would be necessary if vignetting were not to exceed 25 percent of the total scanning time. The vignetting, which reduces the time utilization efficiency, is produced by the movement of the common edge of adjacent facets across the optical aperture.

It can be shown that the two practical limitations which lead to the above difficulty are firstly, that to minimize vignetting each facet must be many times the width of the aperture, and secondly, that the angular displacement of a reflected beam of light is twice the angular displacement of the reflecting mirror, which requires that the number of facets be doubled to avoid low efficiency. The present invention provides a scanning system in which these limitations are largely overcome to give a line scan of improved time utilization efficiency, and hence better thermal resolution for a given framing rate.

According to the invention, an optical scanning system comprises an array of imaging elements disposed in a ring, a faceted mirror having dimensions small compared with the diameter of the ring, the facets of the mirror respectively facing the imaging elements and being inclined to the axis of the ring at an angle such that the reflection of the optical axis of each imaging element in the corresponding facet extends in a direction parallel to the axis of the ring, and means for rotating the array of imaging elements about the axis of the ring and for synchronously rotating the faceted mirror so that each facet in turn passes through a position in which the reflection in that facet of the optical axis of the corresponding imaging element coincides with a given axis.

In use of the system each imaging element and corresponding facet of the mirror are operative in turn for a fraction of each revolution during which the facet passes through said position, an element of an area to be scanned being imaged by the imaging element at or near the relevant facet of the mirror and the position of this element moving along a line due to the rotation. In infrared thermography and similar applications radiation from the element of the area being scanned is received at the relevant facet via the corresponding imaging element and is reflected so as to fall on a suitable detector; in other applications the optical path may be reversed, radiations from a suitable light source being directed on to the relevant facet so as to be reflected to the corresponding imaging element to illuminate the element of the area being scanned.

The present invention enables the illuminated area on the relevant facet to be made small compared with the width of the facet, thereby reducing vignetting effects. The use of inclined facets so that the optical path to the detector or light source extends from the relevant facet substantially parallel to the axis of rotation removes those limitations related to the aforementioned property of a plane mirror, viz that the direction of reflection changes at twice the angular velocity of the mirror.

A fixed optical relay means may be provided to image the detector or light source on to the relevant facet. This relay means may comprise lenses or mirrors, and for the application of the system to infrared thermography is preferably constituted by a pair of off-axis paraboloid mirrors. During each line scan the illuminated patch on these mirrors is subject to slight rotation and may be subject to slight displacement. A constant aperture throughout the scan is desirable, and this can be effected by making the imaging elements and the relay mirrors have different-sized apertures to avoid vignetting, the effective aperture of the scanner then being the smaller of the two. It is preferred to make the relay mirrors or other relay means have the larger aperture, since the dimensions of the imaging elements are determined by other consideration.

The faceted mirror may be disposed symmetrically with respect to the ring, being arranged to rotate about the axis of the ring; preferably, however, the faceted mirror is disposed slightly eccentrically with respect to the ring in such a manner that said given axis coincides with the axis of the ring, since this minimizes the displacement effect referred to in the preceding paragraph. The facets are preferably planar and are inclined at an angle of 45° to the axis of the ring in association with imaging elements whose optical axes are normal to the axis of the ring. The latter is the most convenient and economical arrangement. Other geometrical arrangements which can be used, employing other than 45° facets, involve the associated use of off-axis aspherical imaging elements, which increase the cost.

The imaging elements may be lenses, but where relatively large apertures are required to collect sufficient radiation, as in the case of infrared thermography, they are preferably concave mirrors facing the axis of the ring. Spherical mirrors may be used, but it is preferred to use mirrors of conic section to improve the spatial resolution, e.g. axial paraboloids for scanning distant areas and ellipsoids for areas closer to the scanner. To obtain the maximum aperture, the imaging elements are preferably dimensioned to occupy substantially the whole circumference of the ring.

A reflecting system consisting of or including a plan mirror disposed within the ring may be used to transmit light between the area being scanned and the rotatable imaging mirrors; this plane mirror may be tiltable to provide a frame scan.

Where the optical system is used in an infrared thermographic apparatus it is desirable to incorporate means for providing reference levels for the associated signal-processing circuits, so that the complete apparatus can be continuously self-calibrating. This may for example be effected by providing the faceted mirror with one or more narrow radial vanes which overlap the common edges of pairs of facets between the facets and the detector, and which emit radiation of known temperature into the detector a corresponding number of times per revolution. For example, a vane between each pair of facets will provide one reference level per line scan. With such an arrangement the optical parameters are preferably arranged to focus the image of the detector (and thus of the instantaneously scanned portion of the scene) in the plane of the vane or vanes, instead of actually on each mirror facet in turn. The vanes may be arranged, e.g. inclined, to reflect radiation form a fixed-temperature source, e.g. a black body. Such an arrangement may serve to provide a lower temperature reference level.

Displacing the focused image of the detector from the facets themselves into the plane of the vanes increases the area of the illuminated patch of the facets, which causes some increase in the vignetting. To avoid this effect, the faceted mirror may alternatively be formed with narrow slits between adjacent facets, the fixed-temperature source being disposed on said given axis so that radiation from it will reach the detector via one of the slits between successive line scans, while allowing the detector image to remain focused at the facets themselves.

As a further alternative, nonreflecting "black" vanes can be used which emit radiation at approximately the ambient temperature, means being provided to measure separately the vane temperature, and to feed a corresponding signal to the calibrating circuit.

Another reference arrangement, which may serve to provide an upper temperature reference level, comprises a fixed-temperature source, e.g. a black body, which is arranged to be inserted intermittently, e.g. once per frame of the scan, between the faceted mirror and the imaging elements.

The various self-calibrating arrangement described above are not peculiar to the stated levels, but can each be used at high, low, or intermediate levels.

To enable the nature of the present invention to be more readily understood, attention is directed, by way of example, to the accompanying drawings wherein.

Figure 1:
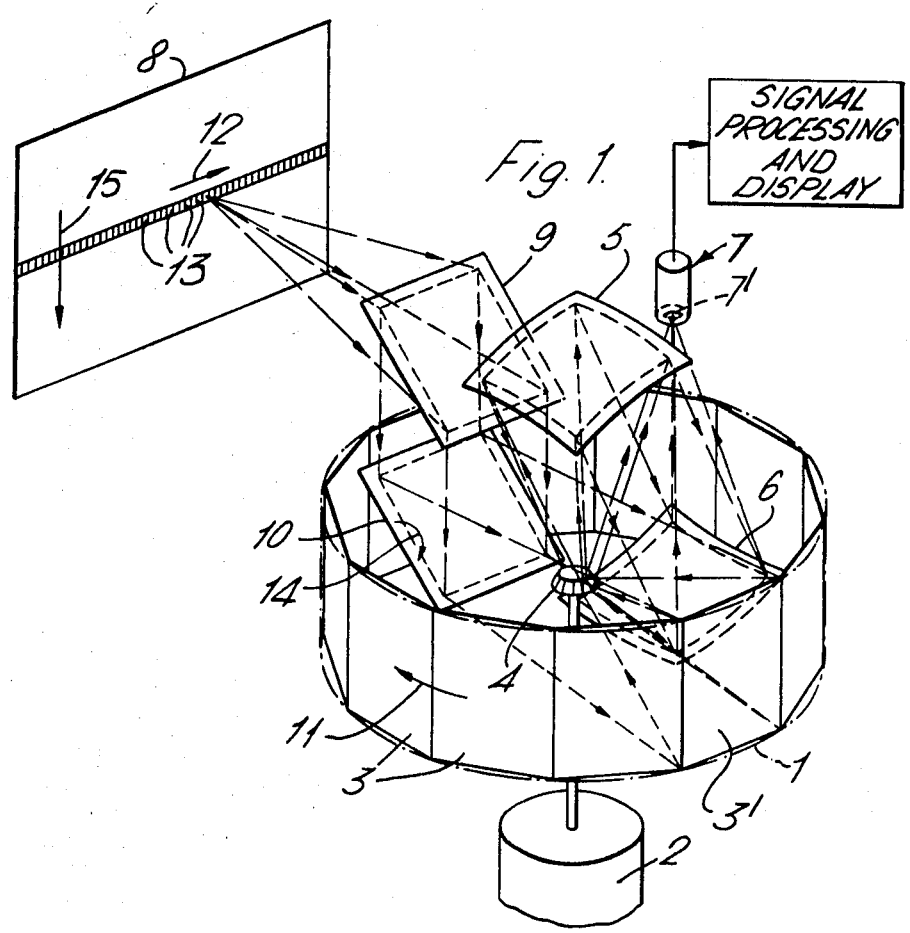
FIGS. 1 and 2 are simplified perspective diagrams of an embodiment of the invention demonstrating the optical principles.

Referring to FIG. 1, an open-topped drum 1 is mounted for continuous rotation by a motor 2. On the inside of the drum are mounted 12 rectangular imaging mirrors 3 directed towards the axis of the drum 1, each mirror 3 subtending an angle of 30° thereat. At the axis, and mounted to rotate with the drum 1, is a 12 faceted mirror 4, each facet being planar and being located opposite a mirror 3 and on the axis thereof. The facets are inclined at 45° to the drum axis, so that light from the imaging mirrors 3 is reflected from the mirror 4 in a direction parallel to the drum axis to a fixed relay mirror 5 thence to a fixed relay mirror 6, and thence brought to a focus at the sensitive element 7' of an infrared detector 7.

The area to be scanned, e.g. a human torso, is represented by the rectangle 8. Infrared light from area 8 reaches each mirror 3 in turn via a pair of plane mirrors 9 and 10 which form a periscope, allowing the light to reach the interior of the drum 1. The shadowing effect of the mirror 4 and its mounting, which lie at the light path, causes a light loss of only a few percent. As the drum 1 rotates, each mirror 3 occupies in turn the position of mirror 3' and receives radiation via the mirrors 9 and 10 from area 8.

The fixed mirrors 5 and 6, which are off-axis portions of parabolic surfaces, can be regarded as producing an image of the element 7' on successive facets of mirror 4. This image can be regarded as reflected by mirrors 3', 10 and 9 to area 8, where the action of mirror 3' is to produce a further image of element 7' on area 8. The optical parameters of the system control the relative sizes of the element 7' and its images on facets 4 and area 8 according to the usual laws of geometrical optics. As each mirror 3 sweeps through the field of view of the mirrors 9 and 10 at 3', due to rotation of the drum 1 as indicated by arrow 11, the image of element 7' is swept across the area 8, as indicated by arrow 12, to produce a line scan. Successive locations of the image on area 8 during the line scan are indicated at 13. What actually happens during the line scan, as will be apparent to those skilled in the art, is that infrared radiation from these successive locations is received by element 7' as mirror 3' rotates through an arc of 30°.

As there are 12 mirrors 3 and 12 facets on mirror 4, 12 lines are scanned per rotation of the drum 1. Frame scan is effected by progressively tilting mirror 10 about a median axis as indicated by arrow 14. The effect is to move successive line scans across the area 8 in the direction of arrow 15. Tilting can be effected by a cam (not shown) driven through suitable gearing from a shaft which rotates the drum 1.

In the present embodiment, the parameters are selected so that, using a detector 7 having an element 7' of effective area 0.5 mm. square, its image at successive locations 13 on area 8 is 3 mm. square at a distance from mirror 3' of 108 cm. Each 30° mirror 3 is a gold-plated plastic ellipsoid 10 cm. wide and 11 cm. high giving a drum radius of 18 cm., which is also the approximate back focal distance of the mirrors 3. The two identical off-axis paraboloid mirrors 5 and 6 (also of gold-plated plastic) are of approximately 16 cm. focal length and provide a 1:1 magnification ratio between mirror 4 and element 7'.

Although the mirrors 3 could be spherical, improved spatial resolution, with the relatively small focal ratios (approx. f/1.5) of the mirrors 3 is obtained with mirrors of conic section. For areas relatively close to the scanner, as in FIG. 1, there are ellipsoids of appropriate eccentricity as described. For other embodiments required to scan relatively distant areas, the eccentricity of the mirrors 3 is increased accordingly, the mirrors becoming in the ultimate axial paraboloids, as well known in the optical art.

The gearing of the framing mirror 10 is such that in nine revolutions of the drum 1, 108 lines are scanned, but two-thirds of a revolution (equivalent to 8 lines) is used to drive the mirror flyback, leaving 100 lines for the frame raster. The frame time utilization efficiency is therefore 92.6 percent. The drum 1 rotates at 9 r.p.s. to give a frame rate of 1 per second.

The frame scan, effected by mirror 10, is 20° giving, with the line scan of 30°, frame dimensions of 45 cm.=30 cm. at area 8. As already described, the image of detector element 7' at area 8 is 3 mm. in diameter, so 150 locations (13) per line scan can be resolved.

The median width of the 45° facets of mirror 4 is 8.28 mm., the center of each mirror being located 16 mm. from the drum axis. With a 0.5 mm. square resolution image focused on the facet surface, only 6 percent of the line scan is vignetted by the facet edges, giving a maximum unvignetted scan efficiency of 94 percent. The total frame time utilization efficiency is therefore 87 percent with the described geometry, although this is reduced somewhat by a self-calibrating means to be described hereafter.

For infrared applications, it is desirable to use reflecting optical elements throughout, as described, because of the high cost of large diameter infrared refractive infrared elements (lenses) and the losses therein at infrared wavelengths. The losses using metallic reflecting surfaces (gold for example) are considerably less. Gold-plated plastic mirrors produced by replication techniques are used in the present embodiment, although other forms an be used.

For applications using visible light, refractive optical elements may be suitable. For such purposes each mirror 3 can be replaced by a lens of appropriate focal length, and the periscope mirrors 9 and 10 are no longer necessary since the "wall" of the drum is then transparent, although a tilting mirror will normally be included in the light path to provide frame scan. The area scanned is of course displaced 180° from the direction shown in FIG. 1. Similarly, the relay mirrors 5 and 6 can be replaced by a lens system.

Figure 2:
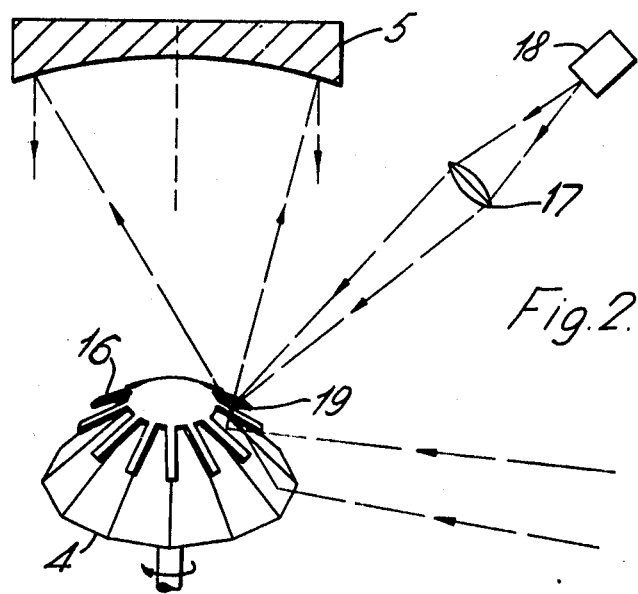

In order to make the signal-processing circuits self-calibrating it is desirable to apply intermittently to detector 7 radiation of a known temperature. This is effected as shown in FIG. 2 by providing the mirror 4 with a vaned member 16 located at its narrower end, each vane overlapping the common edges of each pair of facets. The vanes are 1 mm. wide and have reflecting surfaces from which radiation focused by a germanium lens 17 from a source 18 heated to a fixed known temperature is reflected to detector 7, for which purpose the are appropriately inclined to the optical axis, in FIG. 2 downwards.

The focus of the image at mirror 4 is arranged not to coincide exactly with the surface of the facet, but to be in the adjacent plane of the vaned member 16, as shown at 19. Although this slightly increases the proportion of the facet illuminated by the beam from the mirror 3', the vignetting is not significantly increased thereby. The line scan time utilization efficiency is reduced from 94 percent unvignetted to 88 percent vignetted or 82 percent unvignetted, giving a total frame time utilization (unvignetted) of 76 percent.

The vaned member 16 and source 18 will thus provide a lower reference temperature once per line. An upper reference temperature is provided by solenoid means (not shown), which cause a fixed-temperature source to be inserted in the optical path between mirror 3' and mirror 4, adjacent the latter and blocking off the signal from area 8, once per frame during the eight-line flyback period. Thus, during the flyback period, the detector 7 receives a signal which varies between the upper and lower know temperature limits and can be used by the circuits to self-calibrate their sensitivity in a known manner. Like the mirrors 5, 6, 9 and 10, the detector 7, and the source 18, the solenoid-inserted reference source does not rotate with the drum 1. The upper and lower limits of interest in the medical application are 37° C. and 27° C.

Synchronizing pulses for the signal-processing and display circuits are obtained from 12 polished facets (not shown in FIG. 2) attached to the mirrors 3, which reflect light from a source to a photodiode, but other arrangements can be used, such as a peg or flag associated with each mirror 3 which interrupts a light beam.

The signal-processing and display circuits may comprise an analogue-to-digital converter which samples the analogue signal from detector 7 in a known manner, logic circuits, a set of circuits which generate characters from the digital values, and a television-type tube to which a time-base corresponding to the frame and line scans is applied and on which each character is displayed in a position on the tube screen corresponding to its position in the area 8. In one embodiment the characters displayed represent temperatures between 27° C. and 37° C. in steps of 0.2° C.

Figure 3:
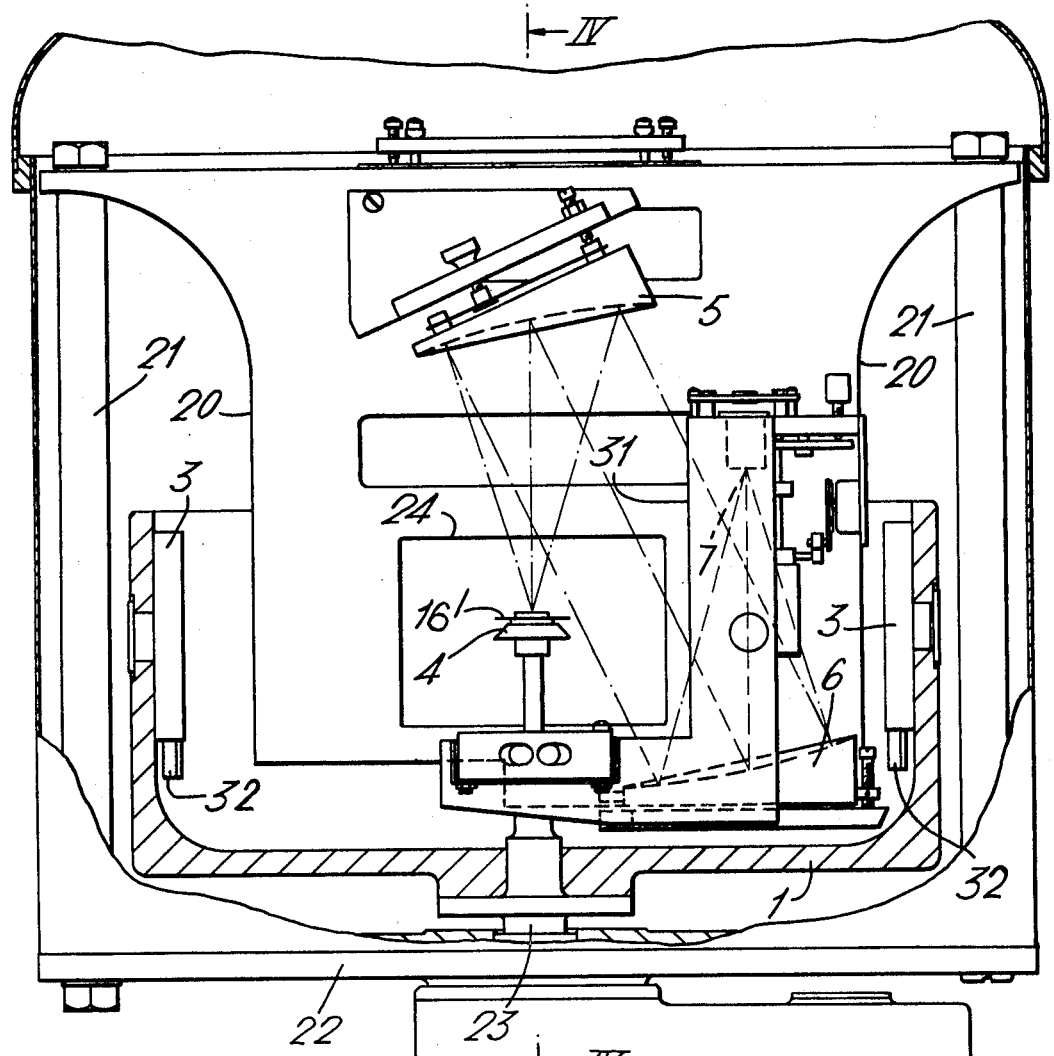
FIG. 3 is a sectional elevation of an embodiment of the invention.
Figure 3:
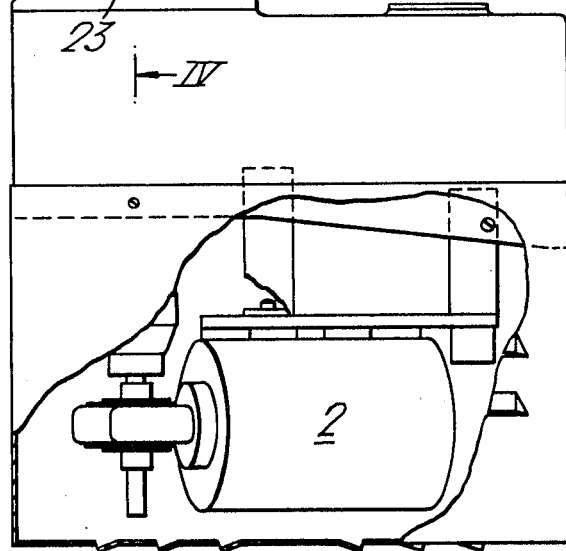

FIGS. 3 an 4 show the embodiment of FIGS. 1 and 2 in more detail, using the same reference numerals. The mirrors 5, 6, 9 and 10 are mounted on a frame 20 secured to pillars 21 on a stationary base 22 through which passes the shaft 23 from motor 2. Frame 20 has an aperture 24 to allow radiation to reach mirror 10 from the mirrors 3, and an opaque case 25, mounted on base 22, and fitted with a removable cover, has an aperture 26 to allow radiation to reach mirror 9 from the area being scanned.

A cam 27 mounted on frame 20 is driven by a gear train 28 from the shaft 23, and engages a roller 29 on mirror 10 to tilt the latter about a pivot 30, in order to provide the frame scan.

The detector 7 is not visible in FIG. 3, but is adjustably mounted behind a member 31 secured to frame 20, in the position indicated by the interrupted lines, with its sensitive area displaced 1.5 cm. from the diameter of the drum 1 (the plane of the drawing) towards to the observer.

The mirror facets for providing line synchronizing pulses are shown at 32, the associated light source and photodiode being omitted for clarity. A polished facet 33 associated with a light source 34 and photodiodes 35 is mounted on cam 37 to provide frame synchronizing pulses. The facets 31 can be replaced by appropriately located pegs or flags which interrupt a light beam, or by other known means for deriving synchronizing signals from a rotating shaft or body. Such alternative arrangements can also replace facet 33, light source 34 and photodiode 35.

Figure 4:
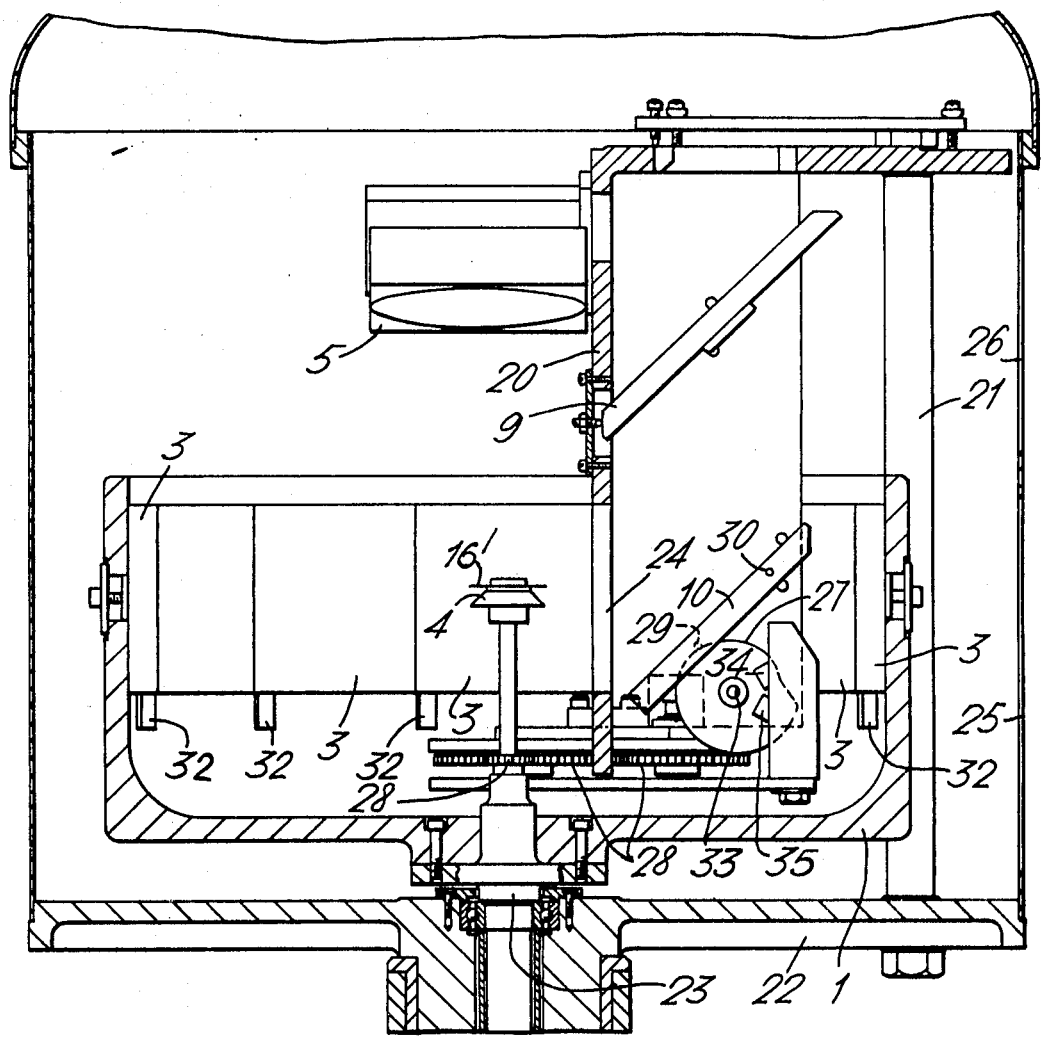
FIG. 4 is a sectional elevation on the line IV—IV of FIG. 3.

In FIGS. 3 and 4, the vaned member 16' has noninclined black vanes which radiate at a temperature depending on the ambient and are associated with thermometric means (not shown) for providing a signal corresponding to their temperature. As described with reference to FIG. 2, an alternative arrangement is to use inclined reflecting facets associated with a fixed temperature source.

Figure 5:
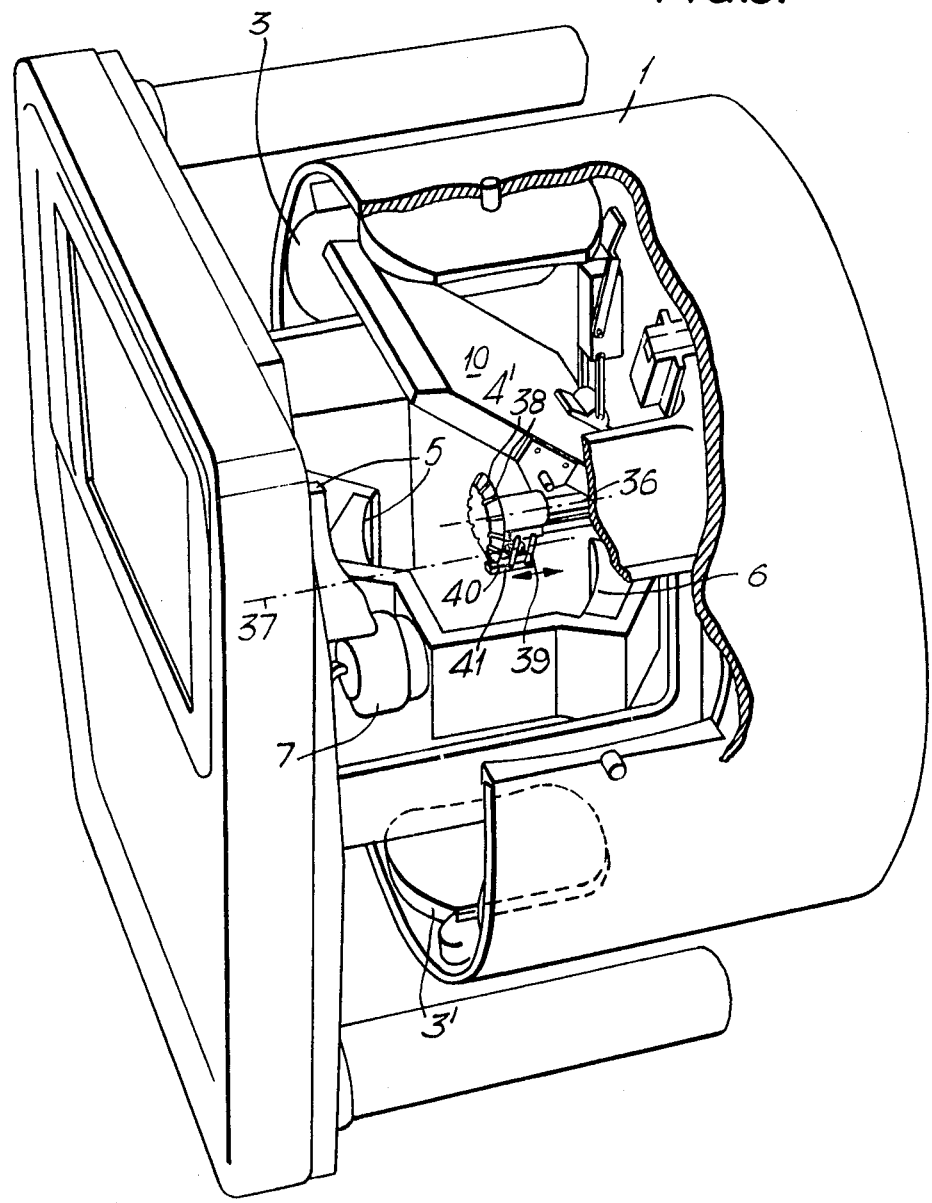
FIG. 5 is a perspective view, partly cut away to show internal details, of part of an alternative embodiment of the invention.

Another alternative arrangement is used in the scanner illustrated in FIG. 5, in which like reference numerals are used to indicate parts similar to those shown in the preceding Figures. In this case the drum 1 is arranged with its axis horizontal, the enabling the optical system to be slightly simplified by omission of the mirror 9; rotation of the drum 1 about its axis again affects a horizontal line scan, and the mirror 10 is tiltable about a horizontal axis to effect a frame scan as before. The faceted mirror 4' is not now disposed coaxially with the drum 1, but is mounted on a horizontal shaft 36 with its axis parallel to but slightly displaced vertically upwards from the axis 37 of the drum 1, the shaft 36 being rotatable synchronously with the drum 1 by means of a geared link (not shown) between them; the displacement of the mirror 4' is such that as each imaging mirror 3 passes through its lowermost position 3' the corresponding facet of the mirror 4' intersects the axis 37. Thus as each mirror 3 passes in turn through the position 3' it is operative in conjunction with the corresponding facet of the mirror 4' to effect a line scan. With this arrangement each mirror 3 is used substantially axially at all points during the line scan, thereby eliminating the residual degradation of the spatial resolution at the ends of the line scan which occurs with the arrangements previously described in which the faceted mirror 4 is precisely coaxial with the drum 1.

In order to provide a lower reference temperature once per line, the faceted mirror 4' has formed in it narrow radial slits 38 disposed respectively between adjacent pairs of facets and a suitable source 39 of radiation is disposed on the axis 37 so that between successive line scans radiation from the source 39 passes through one of the slits 38 along the axis 37 in the same direction as the radiation from the mirror 3' which is reflected by the relevant facet of the mirror 4' during a line scan. This radiation is again directed on to the detector 7 by means of the relay mirrors 5 and 6, and the reference arrangement described is such that the sensitive element of the detector 7 may be imaged exactly on the facets of the mirror 4' so as to minimize vignetting effects. With the arrangement described the illuminated patches on the relay mirrors 5 and 6 are not subject to any appreciable displacement during a line scan, but they are still subject to slight rotation and the considerations set out above relating to the relative sizes of the apertures of the mirrors 3 and the mirrors 5 and 6 are still relevant.

To provide an upper temperature reference, the system includes a further source 40 of radiation which is mounted on a platform 41 movable parallel to the axis of the drum 1 by means of a solenoid (not shown), the source 40 being moved during each frame flyback period into a position immediately below the mirror 4' and being retracted during each frame scan. It will be appreciated that this arrangement is similar to that described in relation to the previous embodiment, but which is not shown in the preceding Figures for the sake of clarity.

In further embodiments of the invention, the optical relay means may be dispensed with and the detector (or light source) mounted close to the faceted mirror, the image of the scanned area being focused on the light detector (or light source); this however entails some sacrifice of performance. It will be apparent that in such an arrangement the effective aperture is reduced by the shadowing effect of the detector (or light source) and the vignetting increased by the fact that the image is not formed on the facet themselves (cf. the use of vanes 17 described earlier). If, to reduce the shadowing, the detector (or light source) is located further from the faceted mirror, the illuminated path on each facet is correspondingly increased in size, thereby further increasing the vignetting. Such an arrangement is therefore not preferred where maximum thermal resolution is desired.

Further modifications may be made to the positioning of the detector (or light source). Thus provided the optical axis of the light leaving the faceted mirror for the detector, or approaching the faceted mirror from the light source, is parallel to the axis of the ring of imaging elements, the remainder of the light path between the faceted mirror and the detector (or light source) may be aligned in any convenient manner and direction, i.e. the path of the approaching the detector, or leaving the light source, may be other than parallel to the axis. When using an indium antimonide infrared detector or a doped germanium detector, a limitation of the orientation of the detector may arise from the need for containing the liquid nitrogen coolant normally used with detectors. Other known forms of infrared detectors do not need such cooling.

Provided that, where appropriate, the need for coolant containment met, the embodiment shown in FIG. 1 can be modified by, for example, locating a mirror at the position occupied therein by element 7, to reflect the light to a detector mounted horizontally elsewhere. Alternatively, the mirrors 5 and/or 6 can be so aligned that the path of the light between mirror 6 and element 7 has any convenient alignment.

The scanning system described above may be provided with a range finder (not shown) for ensuring accuracy of focus. Such a range finder may comprise two visible light beams which merge together at the center of the object plane 8.

The signal-processing and display circuits may be operable from display digital temperature values corresponding to a selected part of area 8, rather than of the whole area.

I claim:

1. An optical scanning system comprising an array of imaging elements disposed in a ring, a faceted mirror having dimensions small compared with the diameter of the ring and disposed substantially centrally with respect to the ring, the facets of the mirror respectively facing the imaging elements and being inclined to the axis of the ring at an angle such that the reflection of the optical axis of each imaging element in the corresponding a direction parallel to the axis of the ring, and means for rotating the array of imaging elements about the axis of the ring and for synchronously rotating the faceted mirror so that each facet in turn passes through a position in which the reflection in the facet of the optical axis of the corresponding imaging element coincides with a given axis.

2. A scanning system according to claim 1, in which said facets inclined at an angle of 45° to the axis of the ring, the optical axes of the imaging elements being normal to the axis of the ring.

3. A scanning system according to claim 1, in which the imaging elements are concave mirrors facing the axis of the ring.

4. A scanning system according to claim 3, further comprising a plane mirror disposed within the ring to transmit light between an area being scanned and the concave mirrors.

5. A scanning system according to claim 4, in which said plane mirror is tiltable about an axis normal to the axis of the ring to provide a frame scan.

6. A scanning system according to claim 1, further comprising a detector sensitive to infrared to receive radiation directed on to the imaging elements and reflected by the faceted mirror along said given axis 7. A scanning system according to claim 6, further comprising an optical relay means arranged optically between the faceted mirror and the detector for imaging a sensitive element of adjacent the facets.

8. A scanning system according to claim 7, in which the optical relay means has a larger aperture than that of each imaging element.

9. A scanning system according to claim 6, further comprising reference means for intermittently directing on to the detector radiation of know temperature.

10. A scanning system according to claim 1, in which the faceted mirror is disposed symmetrically with respect to the ring and is rotatable about the axis of the ring.

11. A scanning system according to claim 1, in which the faceted mirror is disposed eccentrically with respect to the ring by an amount such that said given axis coincides with the axis of the ring.